PIPE WORKING ASSEMBLY

Original Filed July 12, 1965 2 Sheets-Sheet 1

INVENTOR.
JOE A. IVESTER
BY
ATTORNEY

PIPE WORKING ASSEMBLY

Original Filed July 12, 1965 2 Sheets-Sheet 2

INVENTOR.
JOE A. IVESTER
BY
ATTORNEY

United States Patent Office

Re. 27,127
Reissued June 1, 1971

27,127
PIPE WORKING ASSEMBLY

Joe A. Ivester, 62 Rock Creek Drive,
Greenville, S.C. 29605

Original No. 3,332,095, dated July 25, 1967, Ser. No. 471,245, July 12, 1965. Application for reissue July 15, 1969, Ser. No. 848,760
Int. Cl. B23g *1/00*
U.S. Cl. 10—106 7 Claims

Matter enclosed in heavy brackets [ ] appears in the original patent but forms no part of this reissue specification; matter printed in italics indicates the additions made by reissue.

*ABSTRACT OF THE DISCLOSURE*

*A portable power tool assembly for pipe working and the like has a longitudinal driving means, in the form of a bar, drivingly engaged on one end thereof by a power driven longitudinally aligned assembly, a driving connection between the driving means and a spaced longitudinally aligned chuck assembly on the other end of the driving means, a movable housing carrying a longitudinally aligned cutting die assembly, said power driven assembly being carried on one side of the cutting die assembly and the chuck assembly being carried on the other side of the cutting die assembly, and means discharging oil upon the dies and pipe with means collecting such oil, so that a unitary power tool assembly is longitudinally driven to minimize size and enhance the range of its usefulness.*

This invention relates to a portable power tool assembly for working pipes and the like providing a die head and the like, conveniently positionable in working position, which may be driven from a chuck and die assembly positioned in alignment therewith; and having an oil pan to collect oil discharged from an oil supply provided for the cutting head and to support the cutting head when in working position.

Pipe and bolt threading devices have been formerly provided in the form of self contained assemblies suitable for accommodating relatively small pipes and bolts and the like. Devices, such as die head assemblies, have been provided for accommodating larger workpieces, but such have not been provided with conveniently positioned driving or mounting means. It has formerly been necessary to mount such die heads, such as upon three-stand vices, and to employ a driving connection including a universal joint for connecting same to a separate driving unit. It has also been necessary to place a separate oil pan to collect oil, discharged from a separate means upon the workpiece and cutting dies, when employing such die heads.

Accordingly, it is an important object of this invention to avoid the necessity for using a three-stand vice and universal joint drive for die heads and the like.

Another important object of this invention is to provide a portable power tool assembly capable of working upon workpieces of a variety of sizes.

Still another object of the invention is to provide a die head capable of working upon relatively large workpieces which may be raised to inoperative or retired position from operative or operating position.

Another object of the invention is to provide a nozzle discharging oil upon the workpiece during a cutting operation together with an oil pan positioned to receive such discharged oil.

Another important object of the invention is to provide a die head, capable of being moved to retired position, with an oil pan supporting same when in operable position and receiving oil from a nozzle directing same upon the workpiece.

Another very important object of the invention is the provision of a movable die head with a direct driving means from a chuck and cutting die assembly in alignment therewith.

The construction designed to carry out the invention will be hereinafter described together with other features hereof.

Figure 1:
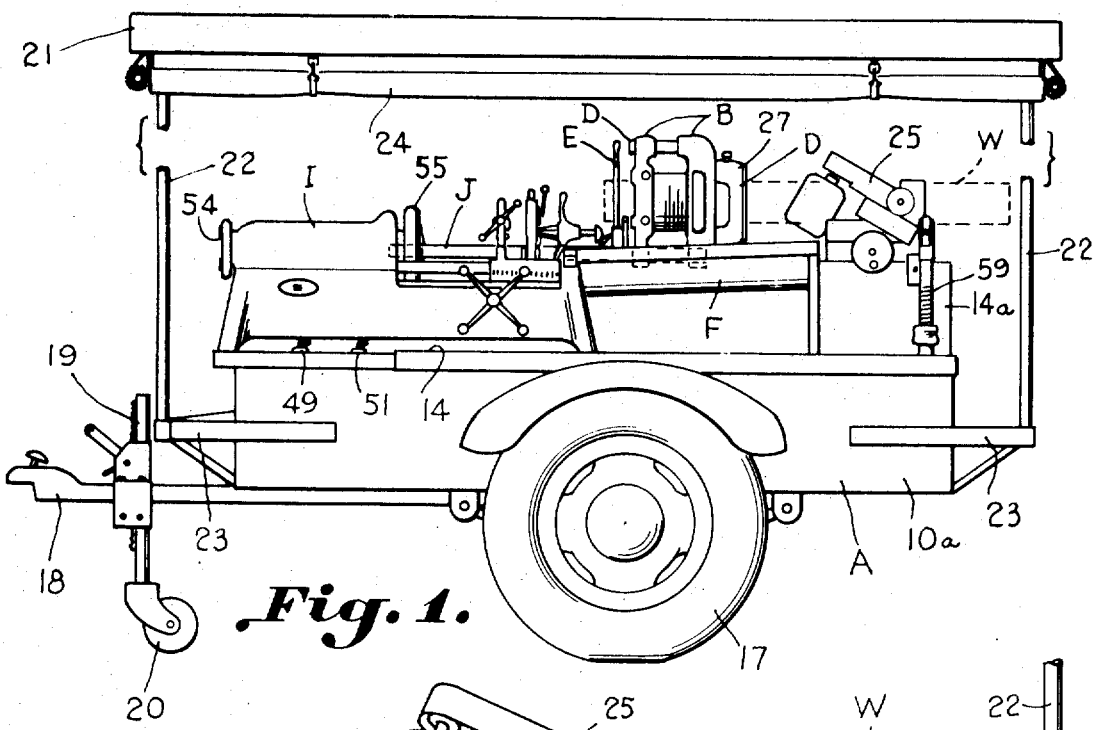
Figure 2:
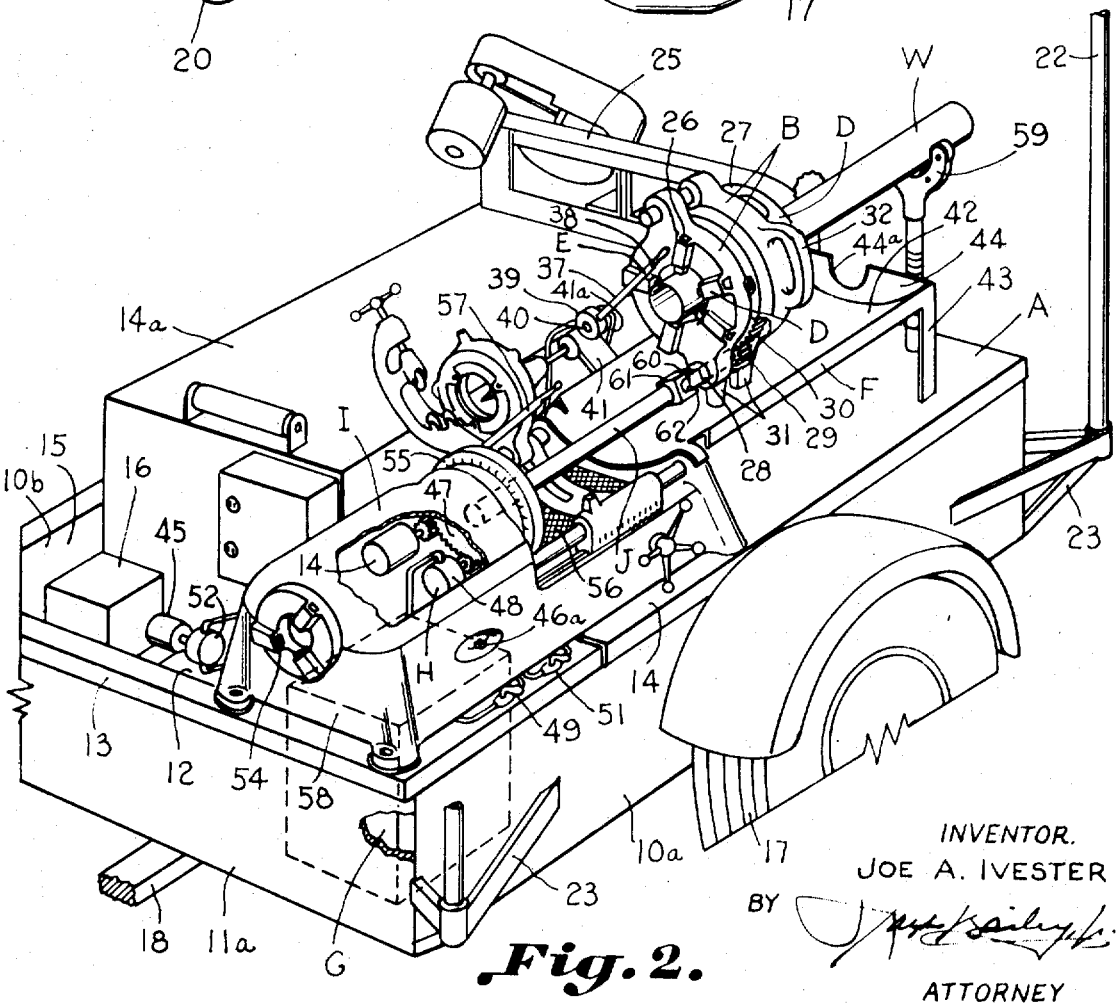
Figure 3:
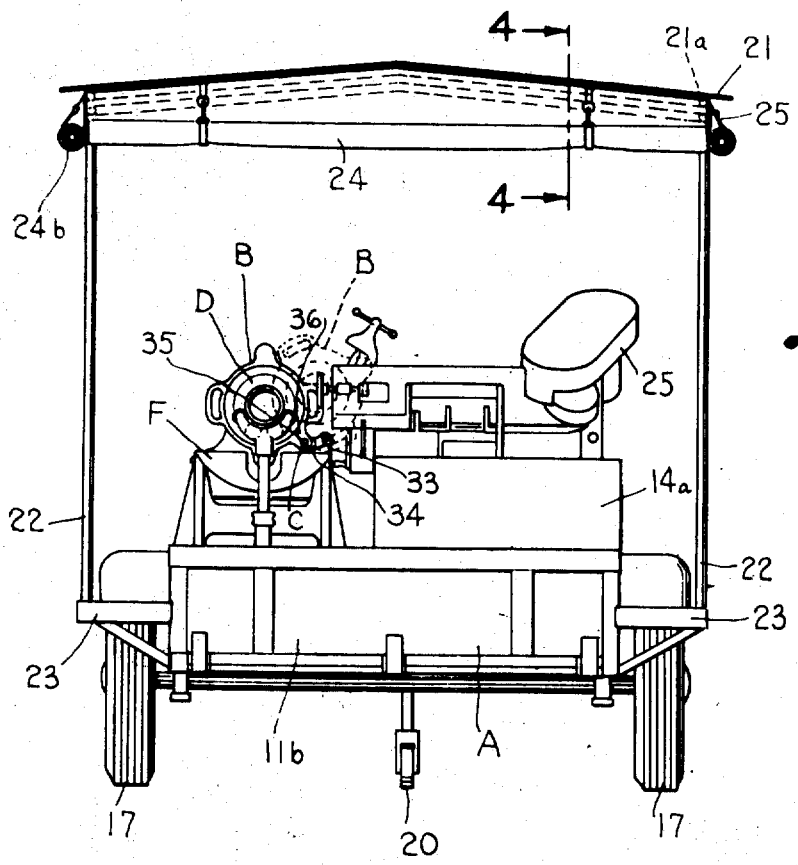
Figure 4:
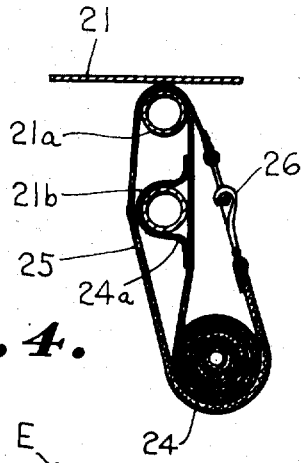
Figure 5:
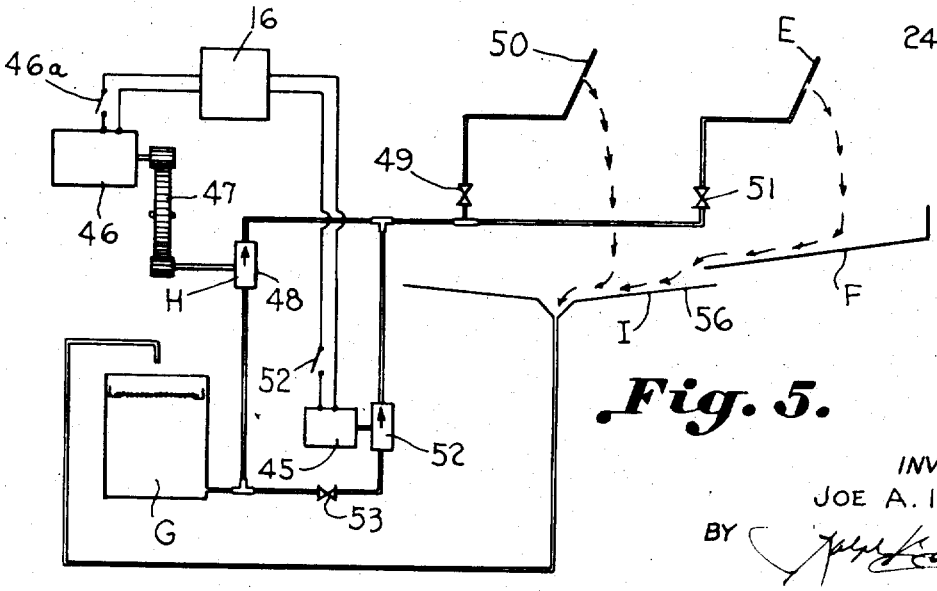

The invention will be more readily understood from a reading of the following specification and by reference to the accompanying drawings forming a part thereof, wherein an example of the invention is shown and wherein:

FIGURE 1 is a front elevation illustrating a pipe working tool assembly constructed in accordance with the invention, FIGURE 2 is a perspective view, with parts broken away, further illustrating the assembly, FIGURE 3 is a side elevation looking toward the right-hand side of FIGURE 1, FIGURE 4 is a longitudinal sectional elevation taken on the line 4—4 in FIGURE 3 at an enlarged scale, and FIGURE 5 is a diagrammatic illustration of the hydraulic and electrical components utilized in the assembly.

The drawings illustrate a portable power tool assembly for pipe working and the like. A trailer platform A supported by wheels carries a housing B. The housing B has a longitudinal pivotal mounting C (FIGURE 3) upon the platform adjacent the rear of the housing for raising and lowering the housing in a transverse plane to inoperable and operable positions, respectively. A first longitudinally aligned chuck and cutting die assembly D is carried by the housing. A nozzle E for discharging oil and the like upon the first assembly and pipe workpiece W during a pipe working operation is carried by the trailer platform. An oil pan F is carried by the platform in fixed relation thereto beneath the housing for collecting oil discharged upon the dies and pipe. The oil pan supports the forward portion of the housing when the housing is in lowered operating position. A reservoir G receives oil from the oil pan and a pump means H feeds oil from the reservoir to the nozzle. A power driven second longitudinally aligned chuck and die assembly I is carried by the platform longitudinally of the first longitudinally aligned chuck and cutting die assembly. A bar J is removably positioned between the first and second assemblies for driving the first assembly from the second assembly. Thus, the first assembly or die head may be conveniently positioned to accommodate the pipe, and may be driven when so positioned from the second assembly. An oil supply is provided for the discharging oil upon the first assembly and an oil pan is provided to collect discharged oil and to support the second assembly in operable or working position. The first assembly B may be raised to retired position to permit smaller pipe to be placed in the second assembly I without obstruction.

The trailer platform A includes front and rear sides 10a and 10b, respectively, and end members 11a and 11b and a bottom portion 12. The platform has an outwardly extending edge portion 13 extending entirely thereabout and is partially covered by a sheet metal portion 14. The sheet metal extends across the trailer and forms a raised support portion 14a on the end of the trailer remote from the front side 10a. A well 15 is formed for accommodating a generator 16 and other components which will be described below. At the end of the trailer adjacent the well a tail gate arrangement could be provided in lieu of the end 11a.

The trailer includes supporting wheels 17 and a trailer hitch 18 extends forwardly and is supported for raising and lowering by a rack and pinion type jack 19 for adjusting the level of the platform A. A caster 20 is carried by the base of the jack. The platform is preferably provided with a sheet metal top 21 which is supported by rods 22 vertically carried by suitable frame supports 23 at each corner. A canopy 24 extends around the trailer for providing a protective cover for the parts contained therein when not in use. As illustrated in FIGURES 1, 3 and 5, the canopy 24 is rolled up and supported in this position by spaced straps 25 which have hook arrangements 26 for joining same about the rolled canopy. A pair of horizontally disposed vertically spaced frame members 21a and 21b extend about marginal portions of the sheet metal roof 21. The canopy is illustrated as being fastened as at 24a about the lower of the frame members 21b. Abutting edges of the canopy portions 24 adjacent the corner posts 22 may be provided with zippers 24b for completely enclosing the trailer when zipped.

A metal band saw 25 and associated parts may be positioned upon the raised support portion 14a. The saw illustrated is a Wells Metal Band Saw, Model 300 of Wells Manufacturing Company, Three Rivers, Mich. A die head includes a housing B which has a pivotal mounting C (FIGURE 3). The housing B accommodates a chuck and cutting die assembly D. The die head illustrated is a No. 141 Jam-Proof Geared Threader, by the Ridge Tool Co., Elyria, Ohio. The housing B accommodates the dies 26 and the chuck 27 of the chuck and die assembly D, as well as a shaft 28 for driving a pinion 29 and ring gear 30 for rotating the chuck 27. The die head is supported upon the legs 31 when in operable or forward position and has a handle 32 for raising the housing B to an inoperable or rearward position as illustrated in dotted lines in FIGURE 3. In inoperable or retired position the housing B rests against a support member 33 carried by the oil pan F. The support member 33 carries a bracket 34 through which a longitudinal pivot pin 35 passes to pivotally connect an integral lug portion 36 of the housing B thereto.

A nozzle E is provided for discharging oil and the like upon the assembly D and the workpiece W, as for example, during a thread cutting operation for lubricating and carrying away metal cuttings. The nozzle E includes an elongated tube 37 having an aperture 38 therein. The elongated tube 37 is carried by a hollow fitting 39 which is rotatably mounted as at 40 upon a bracket 41. The bracket 41 carries a stop 41a for limiting the forward movement of the tubular member 37. The tubular member 37 may also be so positioned rearwardly into a retired or inoperable position.

An oil pan F is carried by the platform A beneath the housing B, when in forward or operating position, for collecting oil discharged upon the dies 26 and pipe workpiece W as during a thread cutting operation. The oil pan F includes a concave trough-like portion 42 which is carried by legs 43 upon the platform. The trough 42 is closed on its left-hand end by the side member 44 which has a cutout portion 44a for accommodating a workpiece as may be employed in connection with a second chuck and cutting die assembly as will be described below. By pivoting the housing B to rearward inoperative position the second assembly I is unobstructed and the pipe workpiece may extend through the cutout portion 44a to the chuck and die of the second assembly. The trough 42 inclines downwardly from right to left and supports the legs 31a, the support 33, and the bracket 41. Thus, the oil pan F collect soil discharged upon the dies 26 and supports the die head when in operable position. A reservoir G which is positioned within the well 15 receives oil from the oil pan F through a sump provided in the second chuck and cutting die assembly, as described below. A pump H is also carried in the wall 15 and is driven by an auxiliary motor 45.

The operation of the electrical and hydraulic components might best be understood by reference to FIGURE 5. The generator 16 provides electric power for the operation of a motor 46 of the second assembly I, which operates through suitable gearing 47 to operate the pump 48. The pump 48 pumps oil through the valve 49 to the nozzle 50 of the second assembly I. The nozzle E is supplied through the valve 51 and if additional pressure is needed the pump 52 may be driven by the motor 45. The motor 45 and the pump H may be controlled through the switch 52 and valve 53 associated therewith. The oil is returned from the sump of the second assembly I to the reservoir G by gravity flow. It will be observed that the motor 46 is controlled through the switch 46a.

The assembly I is illustrated in the form of a No. 535 Pipe and Bolt Threading Machine of Ridge Tool Co. The second assembly I includes cutting dies 54 and a chuck 55. A sump 56 is carried beneath the oil pan F and receives drippings therefrom, as well as from a nozzle 57 associated with the second assembly. It will be noted that the second assembly I has a suitable housing 58 carried upon the platform A for supporting the parts associated therewith, together with the lower end of the oil pan F. It will be observed that a pipe support, of a type supplied by Ridge Tool Co., is illustrated at 59 on the right-hand side of the platform A.

The drive shaft 28 for the chuck 27 carries a portion having opposed flat sides 60. The bar J is provided to be received on one end by the chuck 55 of the second assembly I to be driven thereby to supply a driving force to the chuck 27 of the first mentioned assembly D. The bar J has an enlarged end portion 61 having a hollow inner portion as illustrated at 62 which is complementary to the flat sided portion 60 of the shaft 28. Thus, the shaft portion 28 may be received within the hollow portion 61 of the bar J for a connection therebetween which will resist relative rotation between the bar J and the shaft 28 so that the bar J may afford a direct drive for the first mentioned assembly D from the second assembly I.

While a preferred embodiment of the invention has been described using specific terms, such description is for illustrative purposes only, and it is to be understood that changes and variations may be made without departing from the spirit or scope of the following claims.

What is claimed is:

1. A portable power tool assembly for pipe working and the like including, a platform supported by wheels, a housing, a pivotal mounting for carrying said housing upon the platform adjacent the rear of the housing for raising and lowering said housing to move same to operable and inoperable positions, a first chuck and cutting die assembly carried by the housing aligned longitudinally with respect to said pivotal mounting, said housing being raised and lowered in a transverse plane, a nozzle for discharging oil upon the dies and pipe during a pipe working operation carried adjacent the first assembly, an oil pan carried by the platform beneath the housing for collecting oil discharged upon the dies and pipe, a reservoir receiving oil from the oil pan, a pump feeding oil from the reservoir to the nozzle, a power driven second longitudinally aligned chuck and cutting die assembly carried by said platform spaced longitudinally of said first longitudinally aligned chuck and cutting die assembly, a longitudinal bar drivingly engaged on one end thereof by said second longitudinally aligned chuck and cutting die assembly, and a driving connection between said bar and said first longitudinally aligned chuck and cutting die assembly on the end of said bar when said first assembly is in operable position.

2. A portable power tool assembly for pipe working and the like including, a platform supported by wheels, a housing, a pivotal mounting for carrying said housing upon the platform adjacent the rear of the housing for raising and lowering said housing to move same to operable and inoperable positions, a first longitudinally aligned chuck and cutting die assembly carried by the housing aligned longitudinally with respect to said pivotal mounting, said housing being raised and lowered in a transverse plane, a power driven second longitudinally aligned chuck and cutting die assembly carried by said platform spaced longitudinally of said first longitudinally aligned chuck and cutting die assembly, a longitudinal bar drivingly engaged on one end thereof by said second longitudinally aligned chuck and cutting die assembly, and a driving connection between said bar and said first longitudinally aligned chuck and cutting die assembly on the other end of said bar when said first assembly is in operable position, said driving connection comprising complementary surfaces carried by said bar and said first longitudinally aligned chuck and die assembly resisting turning with respect to each other, whereby the first assembly may be moved to operable position to be driven directly by said second power driven assembly, and moved to inoperable position so as not to interfere with the normal operation of said second power driven assembly.

3. A portable power pipe working tool assembly including, a trailer platform supported by wheels for carrying tools for a variety of pipe working operations, a housing, a longitudinal pivotal mounting for carrying said housing upon the platform adjacent the rear of the housing for raising and lowering said housing to move same to inoperable and operable positions respectively, a chuck and longitudinally aligned cutting die assembly carried by the housing forwardly of said pivotal mounting, said housing being raised and lowered in a transverse plane, a nozzle for discharging oil upon the dies and pipe during a pipe working operation carried adjacent the chuck and die assembly, an oil pan carried by the platform in fixed relation thereto beneath the housing for collecting oil discharged upon the dies and pipe, said oil pan supporting the forward portion of the housing when the housing is in lowered operating position, a reservoir receiving oil from the oil pan, and a pump feeding oil from the reservoir to the nozzle, whereby said chuck and die assembly may be moved to inoperable position so as not to interfere with other operations upon the trailer, and lowered to operable position supported upon the oil pan.

4. A portable power tool assembly for pipe working and the like including, a platform, a housing, a pivotal mounting for carrying said housing upon the platform adjacent the rear of the housing for raising and lowering said housing to move same to inoperable and operable positions respectively, a first longitudinally aligned chuck and cutting die assembly carried by the housing aligned longitudinally with respect to said pivotal mounting, said housing being raised and lowered in a transverse plane, a nozzle for discharging oil upon the dies and pipe during a pipe working operation carried adjacent the first assembly, an oil pan carried by the platform beneath the housing for collecting oil discharged upon the dies and pipe, said oil pan supporting the forward portion of the housing when the housing is in lowered position, a reservoir receiving oil from the oil pan, a pump feeding oil from the reservoir to the nozzle, a power driven second longitudinally aligned chuck and cutting die assembly carried by said platform spaced longitudinally of said first longitudinally aligned chuck and cutting die assembly, a longitudinal bar drivingly engaged on one end thereof by said second longitudinally aligned chuck and cutting die assembly, and a driving connection between said bar and said first longitudinally aligned chuck and cutting die assembly on the other end of said bar when said first assembly is in operable position.

5. A portable power tool assembly for pipe working and the like including, a platform, a housing, a pivotal mounting for carrying said housing upon the platform adjacent the rear of the housing for raising and lowering said housing to move same to inoperable and operable positions respectively, a first longitudinally aligned chuck and cutting die assembly carried by the housing aligned longitudinally with respect to said pivotal mounting, said housing being raised and lowered in a transverse plane, a nozzle for discharging oil upon the dies and pipe during a pipe working operation carried adjacent the first assembly, an oil pan carried by the platform beneath the housing for collecting oil discharged upon the dies and pipe, said oil pan supporting the forward portion of the housing when the housing is in lowered position, a reservoir receiving oil from the oil pan, a pump feeding oil from the reservoir to the nozzle, a power driven second longitudinally aligned chuck and cutting die assembly carried by said platform spaced longitudinally of said first longitudinally aligned chuck and cutting die assembly, a longitudinal bar drivingly engaged on one end thereof by said second longitudinally aligned chuck and cutting die assembly, the chuck of said second chuck and cutting die assembly and the die of said first chuck and die assembly facing inwardly towards each in opposed relation, means discharging oil upon the dies and pipe of said second assembly, and an oil sump between said first and second assemblies for receiving oil from said oil pan and from said means discharging oil upon the dies and pipe of said second assembly.

6. A portable power tool assembly for pipe working and the like including, a trailer platform supported by wheels, a housing, a mounting for carrying said housing upon the platform for moving said housing forwardly and rearwardly to inoperable and operable positions respectively, a first longitudinally aligned chuck and cutting die assembly carried by the housing, a nozzle for discharging oil upon the dies and pipe during a pipe working operation carried adjacent the first longitudinally aligned chuck and cutting die assembly, an oil pan carried by the platform beneath the housing for collecting oil discharged upon the dies and pipe, a power driven second longitudinally aligned chuck and cutting die assembly carried by said platform spaced longitudinally of said first longitudinally aligned chuck and cutting die assembly, a longitudinal bar drivingly engaged on one end thereof by said second longitudinally aligned chuck and cutting die assembly, and a driving connection between said bar and said first longitudinally aligned chuck and cutting die assembly on the other end of said bar when said first longitudinally aligned chuck and cutting die assembly is in operable position.

*7. A portable power tool assembly for pipe working and the like including, a platform, a housing, a mounting for carrying said housing upon the platform for moving said housing to inoperable and operable positions, a longitudinally aligned cutting die assembly carried by the housing, a longitudinally aligned chuck assembly carried by said platform spaced longitudinally of said longitudinally aligned cutting die assembly on one side thereof, means discharging oil upon the dies and pipe during a pipe working operation carried adjacent the longitudinally aligned cutting die assembly, means for collecting oil discharged upon the dies and pipe, a power driven longitudinally aligned assembly carried by said platform space longitudinally on the other side of and in alignment with said longitudinally aligned cutting die assembly so that said cutting die assembly is between said chuck assembly and said power driven assembly, a longitudinal driving means drivingly engaged on one end thereof by said power driven longitudinally aligned assembly, and a driving connection between said driving means and said*

*longitudinally aligned chuck assembly on the other end of said driving means.*

References Cited

The following references, cited by the Examiner, are of record in the patented file of this patent or the original patent.

UNITED STATES PATENTS

| | | | |
|---|---|---|---|
| 2,614,435 | 10/1952 | Chasar | 10—106 |
| 2,692,996 | 11/1954 | Wallace | 10—106 |
| 2,768,550 | 10/1956 | Ingwer et al. | 10—106 |
| 2,916,749 | 12/1959 | Ingwer et al. | 10—106 |
| 3,249,954 | 5/1966 | Franckowiak | 10—106 |

CHARLES W. LANHAM, Primary Examiner

E. M. COMBS, Assistant Examiner

U.S. Cl. X.R.

408—61